(12) United States Patent
Hammetter et al.

(10) Patent No.: US 11,195,504 B1
(45) Date of Patent: Dec. 7, 2021

(54) ADDITIVELY MANUFACTURED LOCALLY RESONANT INTERPENETRATING LATTICE STRUCTURE

(71) Applicant: National Technology & Engineering Solutions of Sandia, LLC, Albuquerque, NM (US)

(72) Inventors: Chris Hammetter, Albuquerque, NM (US); Michael B. Sinclair, Albuquerque, NM (US); Timothy F. Walsh, West Lafayette, IN (US); Harlan James Brown-Shaklee, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 496 days.

(21) Appl. No.: 16/206,722

(22) Filed: Nov. 30, 2018

(51) Int. Cl.
| | |
|---|---|
| *G10K 11/162* | (2006.01) |
| *G10K 11/172* | (2006.01) |
| *B33Y 50/02* | (2015.01) |
| *B33Y 80/00* | (2015.01) |

(52) U.S. Cl.
CPC ............ *G10K 11/162* (2013.01); *B33Y 50/02* (2014.12); *B33Y 80/00* (2014.12); *G10K 11/172* (2013.01)

(58) Field of Classification Search
CPC .... G10K 11/172; G10K 11/162; B33Y 50/02; B33Y 80/00
USPC ........................................................ 181/207
See application file for complete search history.

(56) References Cited

U.S. PATENT DOCUMENTS

| | | | |
|---|---|---|---|
| 8,857,564 B2 * | 10/2014 | Ma | G10K 11/18 181/286 |
| 9,418,646 B2 * | 8/2016 | Daley | G10K 11/172 |
| 10,060,217 B2 * | 8/2018 | Murphree | E21B 33/1208 |
| 10,830,102 B2 * | 11/2020 | Martin | B22F 10/20 |
| 2012/0061176 A1 * | 3/2012 | Tanielian | G10K 11/162 181/207 |
| 2016/0027425 A1 * | 1/2016 | Cook | F28F 1/00 428/221 |
| 2016/0027427 A1 * | 1/2016 | Yang | G10K 11/175 181/286 |

OTHER PUBLICATIONS

Banerjee, B. et al., "Large Scale Parameter Estimation Problems in Frequency-domain Elastodynamics Using an Error in Constitutive Equation Functional," Comput. Methods Appl. Mech. Engrg., vol. 253 (2013), pp. 60-72.
Liu, Z. et al., "Locally Resonant Sonic Materials," Science, vol. 289 (2000), pp. 1734-1736.

(Continued)

*Primary Examiner* — Forrest M Phillips
(74) *Attorney, Agent, or Firm* — Yee & Associates, P.C.

(57) ABSTRACT

A method and apparatus for attenuating acoustic waves is provided. A lattice is formed with a plurality of support struts. A plurality of resonating struts are formed extending between the support struts, wherein the resonating struts are configured to attenuate acoustic waves within a predetermined range of frequencies while allowing acoustic waves outside the predetermined range of frequencies to pass through the resonant structure unattenuated. The resonant structure is interposed between two bodies to isolate one body from acoustic waves from the other body over the predetermined range of frequencies.

22 Claims, 8 Drawing Sheets

(56) References Cited

OTHER PUBLICATIONS

Yu, N. et al., "Light Propagation with Phase Discontinuities: Generalized Laws of Reflection and Refraction," Science, vol. 334 (2011), pp. 333-337.
Matlack, K.H. et al., "Composite 3D-printed Meta-Structures for Low Frequency and Broadband Vibration Absorption," Proc. Natl. Acad. Sci., vol. 113, No. 30 (2016), pp. 8386-8390.
Reichl, K.K. et al., "Lumped Mass Model of a 1D Metastructure for Vibration Suppression with No Additional Mass," Journal of Sound and Vibration, vol. 403 (2017), pp. 75-89.
Reichl, K.K., Inman D.J. "Constant Mass Metastructure with Vibration Absorbers of Linearly Varying Natural Frequencies". In: Mains M., Blough J. (eds) Topics in Modal Analysis & Testing, vol. 10 (2017). Conference Proceedings of the Society for Experimental Mechanics Series. Springer, Cham, pp. 153-158.
Lu, L. et al., "Topology Optimization of Acoustic Metamaterials with Negative Mass Density Using a Level Set-based Method," Mechanical Engineering Journal, vol. 1, No. 4 (2014), pp. 1-18.

\* cited by examiner

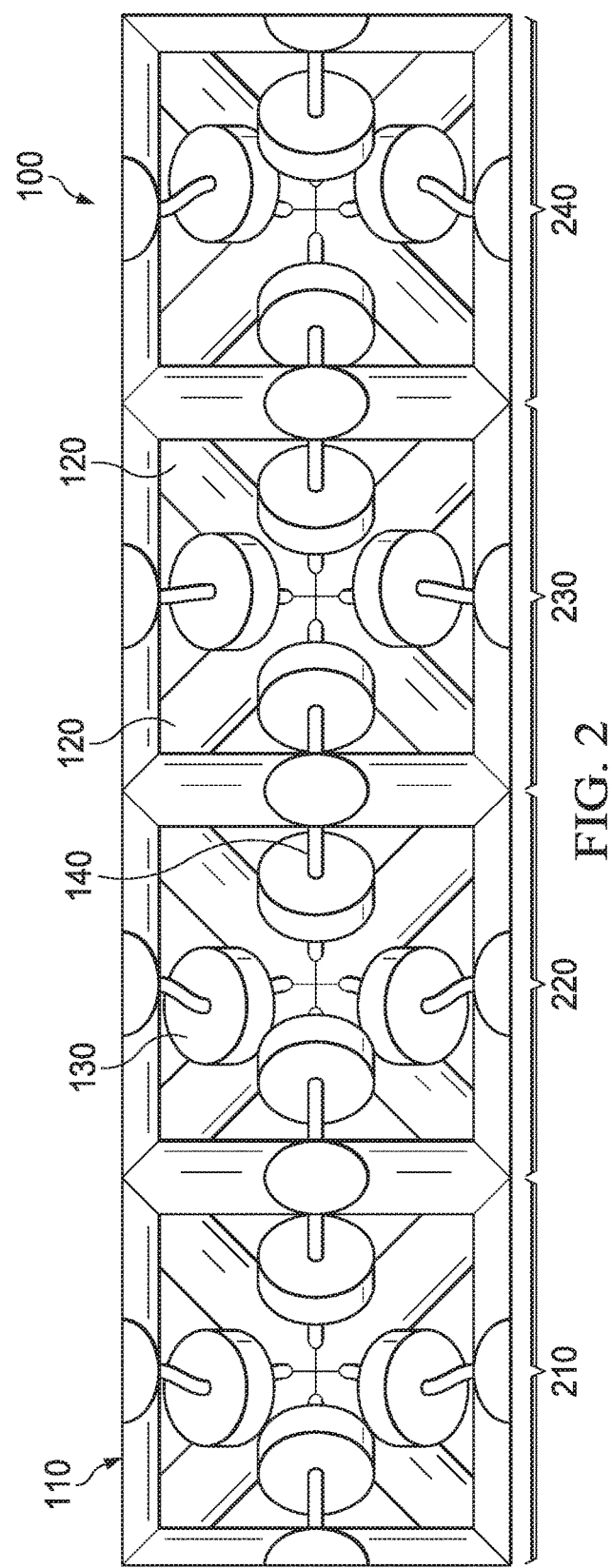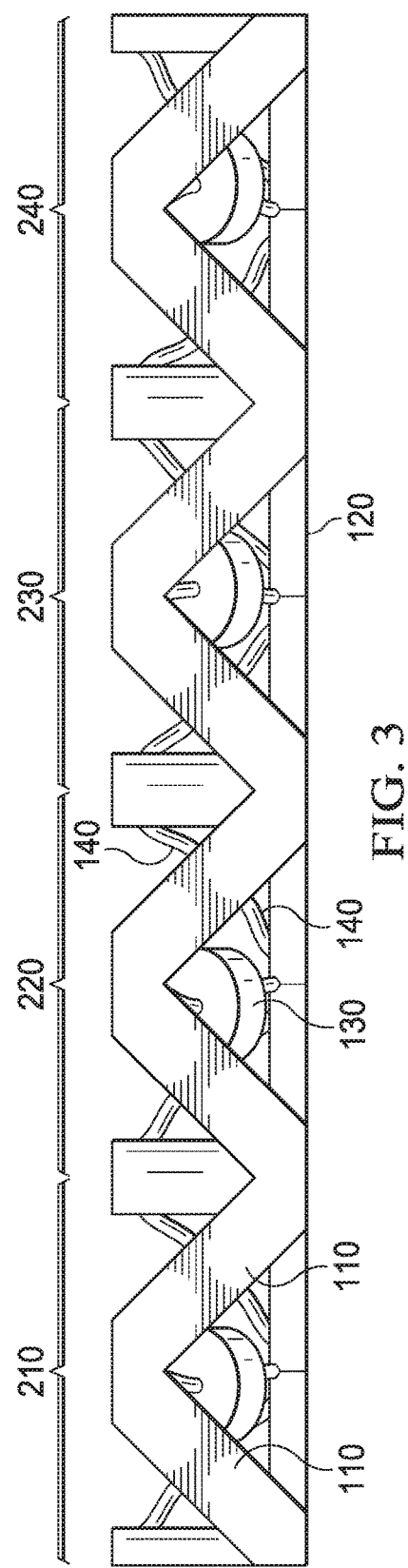

ADDITIVELY MANUFACTURED LOCALLY RESONANT INTERPENETRATING LATTICE STRUCTURE

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

CROSS-REFERENCE TO RELATED APPLICATIONS

This application is related to the patent application entitled "COMPUTATIONALLY OPTIMIZED AND MANUFACTURED ACOUSTIC METAMATERIALS", Ser. No. 16/206,740, filed Nov. 30, 2018 and assigned to the same assignee. The aforementioned application is incorporated herein by reference in its entirety.

BACKGROUND

1. Field

The disclosure relates generally to acoustics, and more specifically, to a structure and method for acoustic attenuation.

2. Description of the Related Art

The ability to isolate a component from acoustic waves of a particular frequency is desirable for a wide range of applications. Acoustically resonant objects have particular frequencies at which they easily vibrate, while vibrating less strongly at other frequencies. Such vibrations can be troublesome for high-precision functions and operations that are sensitive to mechanical disturbances.

For example, sensitive electronics can be subject to internal resonances that are excited by specific acoustic frequencies, thereby negatively affecting their accuracy and performance. Specific examples include accelerometers and data recorders. Another example is nanoscale manufacturing in which ambient vibrations produced by nearby equipment can produce acoustic resonance that negatively impacts the accuracy of the manufacturing tools. In extreme cases, resonance at a system's natural frequency of vibration can result in mechanical failure of the system.

Therefore, it would be desirable to have a method and apparatus that take into account at least some of the issues discussed above, as well as other possible issues. For example, it would be desirable to have a method and apparatus that take advantage of the dynamic qualities of resonant structures to acoustically isolate sensitive components from particular frequencies.

SUMMARY

According to one embodiment of the present invention, a resonant structure is provided. The structure comprises a lattice including a plurality of support struts. A plurality of resonating struts extend between the support struts, wherein the resonating struts are configured to attenuate acoustic waves within a predetermined range of frequencies while allowing acoustic waves outside the predetermined range of frequencies to pass through the resonant structure unattenuated.

According to another embodiment of the present invention, a method of attenuating acoustic waves is provided. A lattice is formed with a plurality of support struts. A plurality of resonating struts are formed extending between the support struts, wherein the resonating struts are configured to attenuate acoustic waves within a predetermined range of frequencies while allowing acoustic waves outside the predetermined range of frequencies to pass through the resonant structure unattenuated. The resonant structure is interposed between two bodies to isolate one body from acoustic waves from the other body over the predetermined range of frequencies.

BRIEF DESCRIPTION OF THE DRAWINGS

FIG. 2 is a top plan view of an acoustically resonant lattice in accordance with illustrative embodiments;

FIG. 3 is a side view of an acoustically resonant lattice in accordance with illustrative embodiments;

DETAILED DESCRIPTION

The ability to isolate a component from acoustic waves of a particular frequency, either through reflection, redirection, or attenuation, is desirable for many applications spanning a large range of scales and frequencies. The present disclosure provides a lattice structure containing resonators that are tuned to attenuate a particular range of frequencies while allowing vibrational energy at other frequencies to pass with little or no attenuation.

The approach of the present disclosure provides two interpenetrating lattices, one providing support for the other which is tuned to provide locally resonant behavior. The structural lattice is designed so that its own resonances occur outside the range of frequencies for which no attenuation is desired. To drive the resonant frequency lower, additional mass is added to the resonating members. This can be done without affecting the stiffness of the resonator. The amount of attenuation can be increased by increasing the number or mass density of the resonators in the path of the acoustic waves as they travel through the lattice structure.

The structure of the present disclosure can be used to passively attenuate acoustic waves by placing the structure between two bodies in order to isolate one body from acoustic waves from the other over a selected frequency range. For example, the lattice structure can be used as a mounting block for an accelerometer while still allowing measurement of accelerations over non-attenuated frequency ranges.

Figure 1:
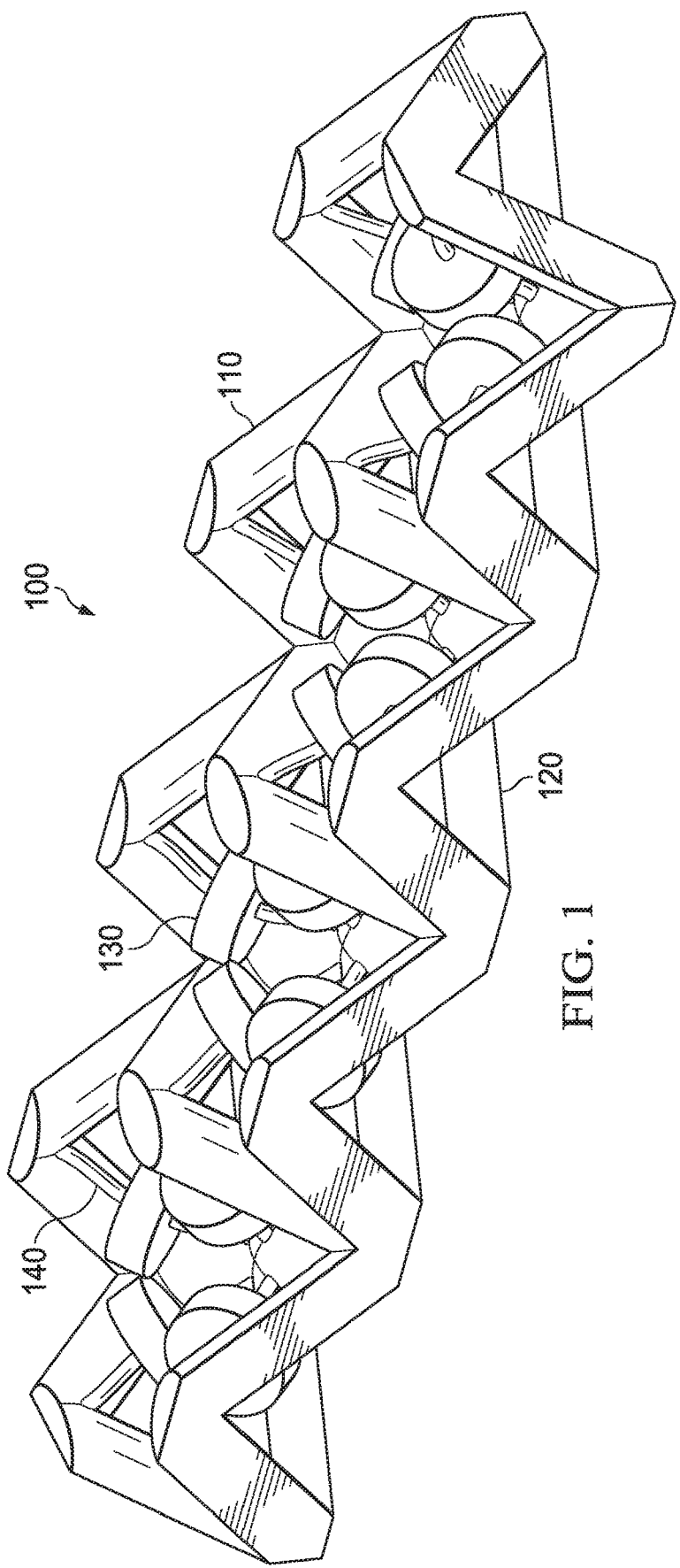
FIG. 1 is a perspective view of an acoustically resonant lattice in accordance with illustrative embodiments.

FIG. 1 is a perspective view of an acoustically resonant lattice in accordance with illustrative embodiments. FIG. 2 is a top plan view of an acoustically resonant lattice in accordance with the illustrative embodiments. FIG. 3 is a side view of an acoustically resonant lattice in accordance with the illustrative embodiments.

The lattice 100 comprises two interpenetrating lattice structures. The first lattice structure provides structural support in the form of strut members 110, 120. As shown in FIG. 1, the support struts 110, 120 form a pyramidal lattice structure. In the illustrative embodiment the basic pyramidal units form rectangular lattice cells 210, 220, 230, 240. As shown most clearly in FIG. 1, the bottom support struts 120 form a fully crossed X base structure for each cell comprising four struts intersecting at a central lattice point. Each side of the cells comprises two lateral support struts 110 forming a planar truss, shown most clearly in FIGS. 1 and 3.

The second lattice comprises resonating discs 130 inside the support lattice cells 210, 220, 230, 240. These resonating discs 130 are connected to the support strut members 110, 120 by stems 140. In the illustrative embodiment each resonating member is connected between the center lattice point of the base of each cell and a lateral lattice point of one of the trusses. The resonating discs 130 in combination with their respective connecting stems 140 form resonating struts. Mechanically, these resonating struts act like springs (i.e. simple harmonic oscillators). In addition to discs, the resonating members can assume other shapes such as cubes, spheres, etc., that provides a reaction mass in the center of the resonating struts to provide the desired harmonic oscillation.

The mass-spring systems of the resonating struts are configured to attenuate acoustic waves by reflecting, redirecting, and/or dampening the waves within a specified range of frequencies while allowing waves at other wavelengths to pass through the lattice with little or no attenuation. The resonating struts can also store energy either elastically or kinetically. The lattice structure 100 is tuned to a specific frequency or range of frequencies by adjusting the number, mass density, and/or stiffness of the resonating struts. The mass densities of the discs 130 can differ from each other in order to tune the lattice 100 to the proper frequency.

The geometric configuration of lattice structure 100 in combination with the weight and number of resonating discs 130 can provide the lattice with the acoustic properties of a negative effective dynamic moduli, a negative effective dynamic density, a negative refractive index, an imaginary speed of sound, a complex wave number, and/or a purely imaginary wave number. The lattice 100 can be configured to produce the acoustic properties of acoustic dampening, structural isolation, acoustic cloaking, and no vibrational wave propagation.

Because the acoustic attenuation is produced by the geometry and weight of the lattice structure, the lattice can be constructed from a single material, making them more easily manufactured using available additive manufacturing (i.e. 3D printing) techniques such as powder bed selective laser sintering. For example, that lattice structure can be made from 304L stainless steel. Examples of other materials that can be used for fabricating the lattice include other metals, polymers, concrete, glass, and ceramics. The choice of material depends on the specific method of manufacture and the desired mass density and stiffness of the resonating struts needed to selectively tune the lattice for the specified acoustic frequency range.

Figure 4:
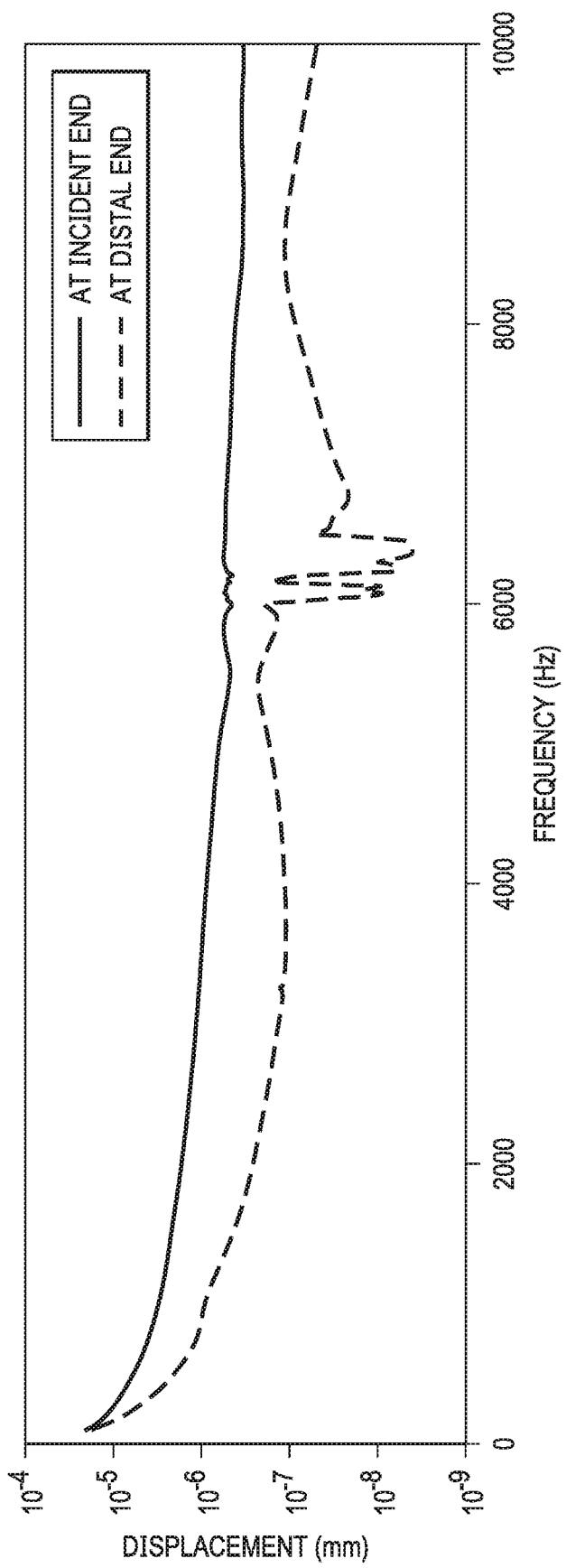
FIG. 4 is a graph illustrating acoustic damping by a resonant lattice in accordance with an illustrative embodiment.

FIG. 4 is a graph illustrating acoustic damping by a resonant lattice in accordance with an illustrative embodiment. In this example, the lattice is tuned to a frequency of approximately 6175 Hz. The top line represents the amount of displacement occurring at the incident end of the lattice structure. The bottom line represents displacement at the distal end of the lattice. As can be seen the displacement at the distal end is markedly reduced within a frequency range centered around 6175 Hz, with only modest attenuation at other frequencies outside this range.

This specifically tuned attenuation can be applied to isolate components that are specifically vulnerable to resonance at particular frequencies.

To accomplish this goal, lattice cells can be arranged in different configurations as needed to protect the component in question.

Figure 5:
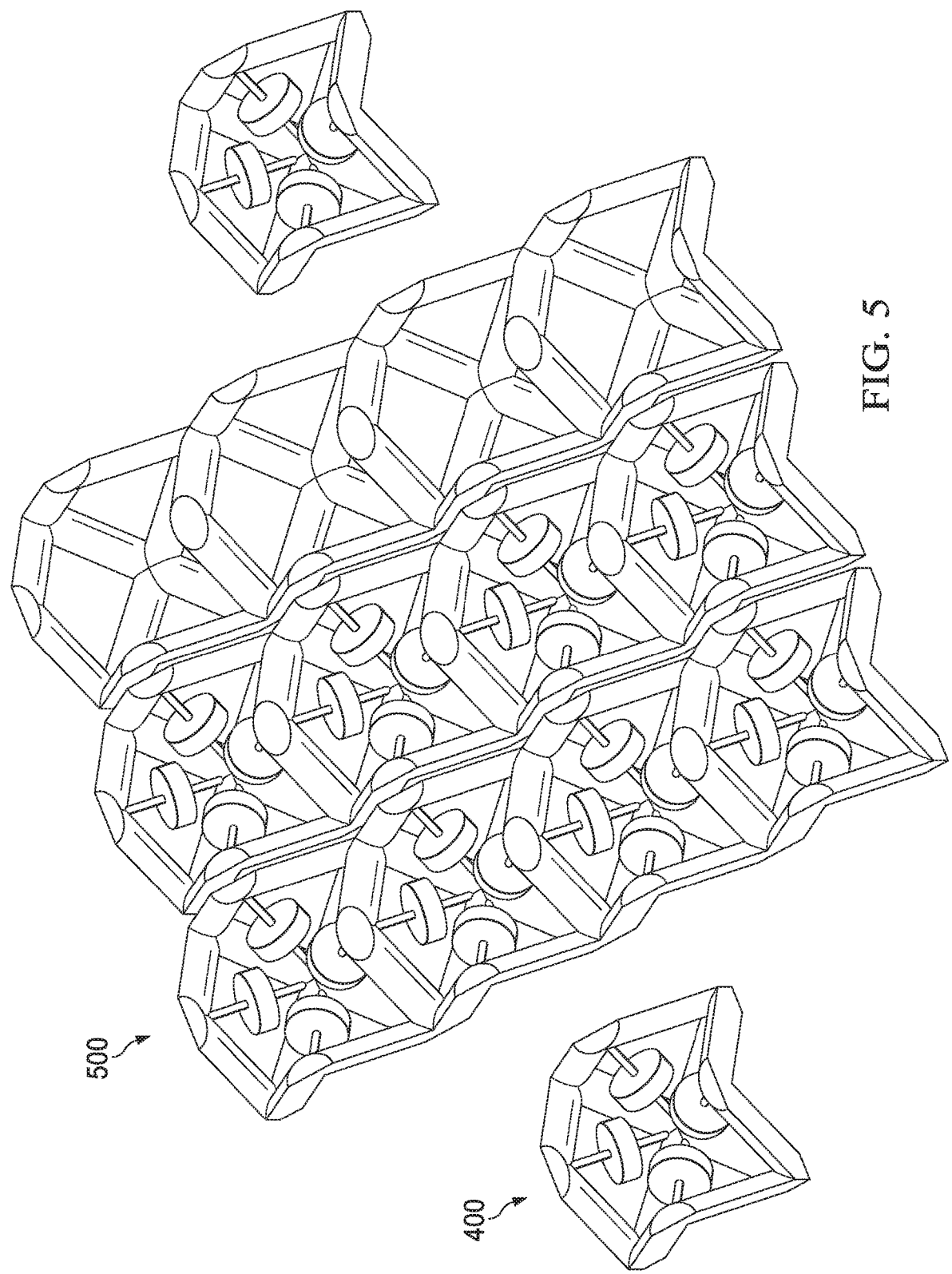
FIG. 5 depicts a 3D printed steel lattice cell array in conjunction with an illustrative embodiment.

FIG. 5 depicts 3D printed steel a lattice cell array in conjunction with an illustrative embodiment. This figure illustrates how individual lattice cells such as cell 400 can be combined together to form an array such as array 500 depending on the area and size of the object to be protected.

Figure 6:
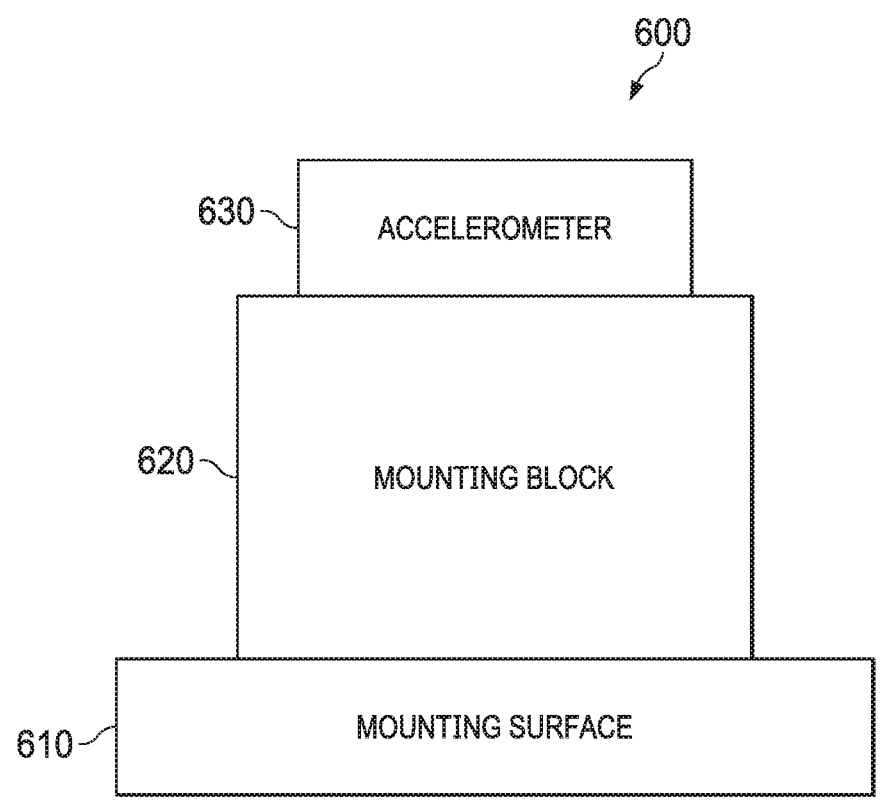
FIG. 6 depicts a mounting configuration for an accelerometer in accordance with an illustrative embodiment.

FIG. 6 depicts a mounting configuration for an accelerometer in accordance with an illustrative embodiment. The mounting array 600 includes a mounting block 620 on a mounting surface 610. In this specific embodiment, an acoustically resonant lattice structure is built into the mounting block 620. For ease of illustration, the lattice is not explicitly shown.

The accelerometer 630 is mounted on top of the structural mounting block 620. With this mounting configuration, vibrations originating from the mounting surface 610 pass through the mounting block 620 before reaching the accelerometer 630. The resonant lattice structure in the structural mounting block attenuates acoustic waves from the mounting surface 610 that fall within the selected frequency range before they reach the accelerometer 630. The selected frequency range will cover those wavelengths determined to produce unwanted resonance in the accelerometer, thereby degrading its accuracy and performance.

The use of the attenuating lattice structure in the mounting block reduces the need to include addition structures and materials to the mounting arrangement to protect the accelerometer, thereby simplifying the configuration over prior approaches.

It should be emphasized that the example configuration in FIG. 6 is simply one of many potential arrangements for acoustic attenuation. The resonant lattice structure is not limited to just linear configurations for shielding one body from another. For example, the lattice structure can fully encompass the first body to be acoustically shielded, and the second body (vibrational source) can form a shell around the lattice. The key to acoustic attenuation is interposing the lattice structure between the two bodies, regardless of the specific geometric configuration.

Figure 7:
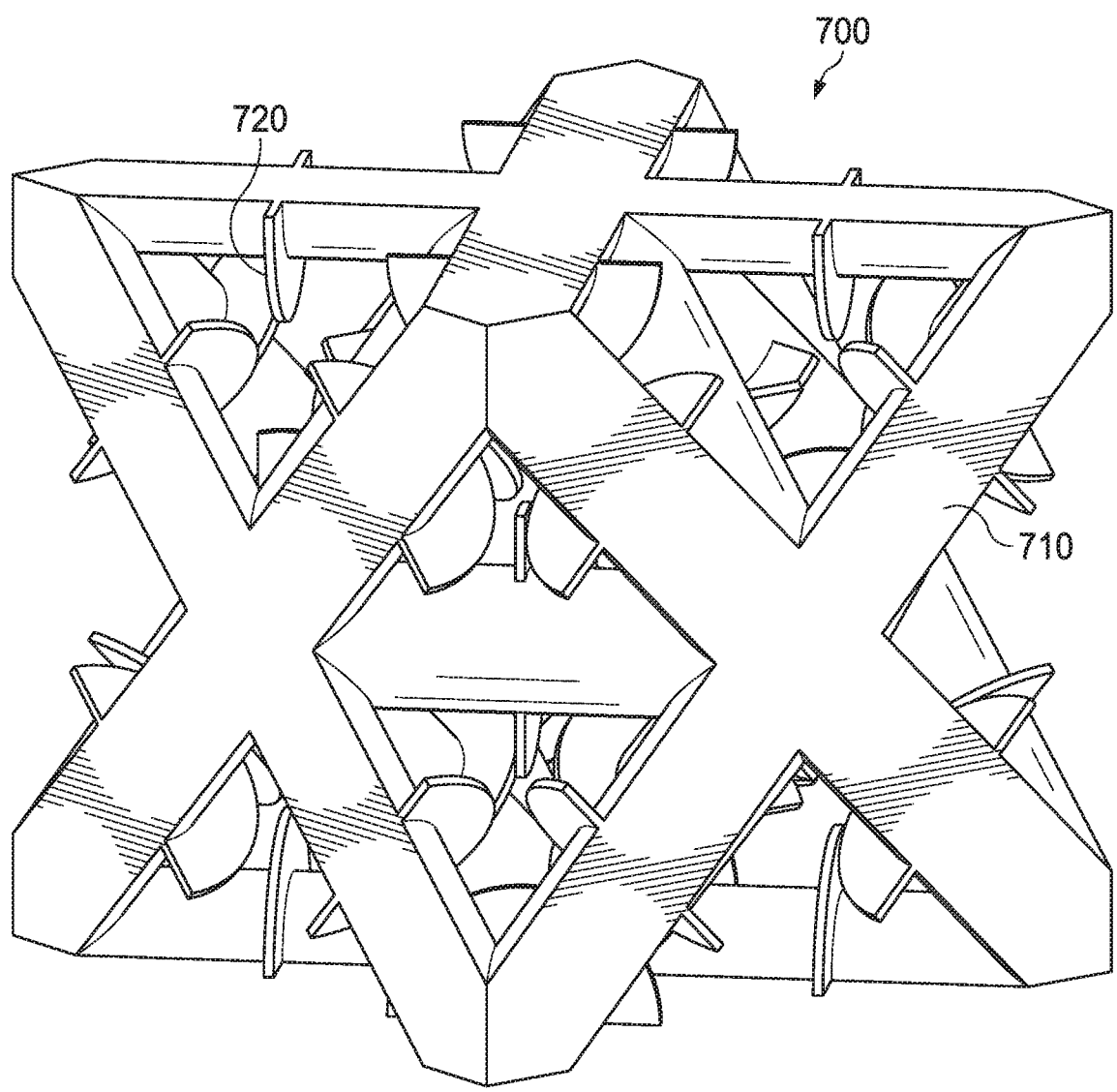
FIG. 7 is a perspective view of resonant lattice structure in accordance with an alternate embodiment.

FIG. 7 is a perspective view of resonant lattice structure in accordance with an alternate embodiment. In this embodiment the pyramidal lattice units form a cell 700 having a face-centered, cubic structure. In this embodiment, the resonant discs 720 are mounted directly on the support struts 710. The cubic lattice cell 700 can be used as the basic building block for larger resonant structures such as, for example, structural block 620 in FIG. 6. As with the embodiments described above, the resonance of cell 700 can be tuned for specific frequencies by adjusting the mass density of the discs 720.

Figure 8:
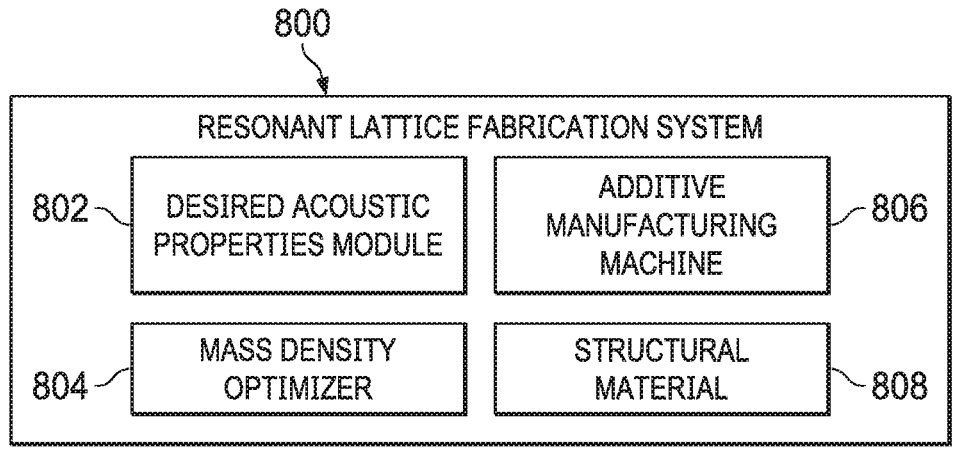
FIG. 8 is a diagram of a resonant lattice fabrication system in accordance with an illustrative embodiment.

FIG. 8 is a diagram of a resonant lattice fabrication system in accordance with an illustrative embodiment. The system 800 includes a desired acoustic properties module 802, a mass density optimizer 804, an additive manufacturing machine 806, and structural material 808.

The desired acoustic properties module 802 includes one or more acoustic properties that are desired of the resonant lattice structure to be constructed in order to attenuate acoustic frequencies within a predetermined range. Acoustic properties may include a desired level of acoustic or vibrational dampening, filtering of unwanted vibrational frequencies, filtering of unwanted vibrational frequencies, acoustic insulation, and acoustic insulation for internal noise damping. The desired acoustic properties may be expressed in terms of moduli, refractive index, speed of sound through the acoustic metamaterial or associated with a local resonance, and wave numbers. The density and refractive index may each be either positive or negative. The speed of sound may be either a real number, a purely imaginary number, or a complex number. The wave numbers may be real, complex, or purely imaginary.

The desired acoustic properties, including the frequency range to be attenuated, contained in the desired acoustic properties module 802 may be obtained from input from a user or from another process and may be stored in a data store such as a database.

The mass density optimizer 804 optimizes the mass density of each of a plurality of resonating discs to tune the lattice according to the desired acoustic properties obtained from module 802 such that the resulting resonant lattice fabricated by the fabrication system 800 will attenuate acoustic frequencies within the selected range.

Figure 9:
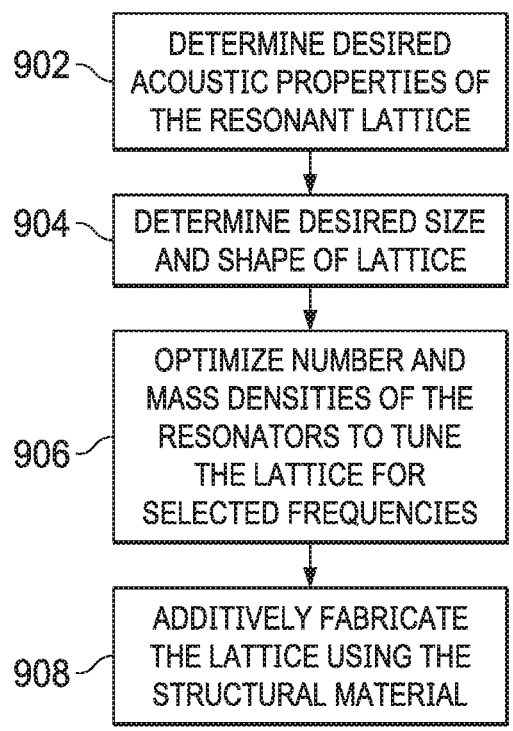
FIG. 9 is a flowchart of a process for fabricating a resonant lattice in accordance with an illustrative embodiment.

Turning next to FIG. 9, a flowchart of a process for fabricating a resonant lattice is depicted in accordance with an illustrative embodiment. The process begins by determining desired acoustic properties of the resonant lattice to be fabricated (step 902). The desired acoustic properties may be determined based on input values received from a user or from another process. The desired acoustic properties may be, for example, wave bending parameters, wave steering parameters, wave focusing parameters, boundary conditions (e.g., one end of the lattice should remain stationary even while the other end is subjected to vibrational forces or displacement), acoustic damping, selectively damping specified frequencies, etc. The desired acoustic properties are selected according to the range of acoustic frequencies to be attenuated by the lattice.

Next, the desired size and shape of the lattice is determined (step 904). The size and shape of the lattice is determined according to its purpose. For example, the size of an acoustic metamaterial that is to be incorporated into an aircraft wing may be drastically different from the size of an acoustic metamaterial that is to be incorporated into an accelerometer. The size of the overall lattice structure can vary by changing the size of the lattice cells and/or the total number of cells in the lattice structure. As explained above, the shape of the lattice structure can also vary according to the shape and size of the objects between which the lattice will be interposed.

Next, the number and mass densities of the resonator discs are optimized to tune the lattice structure to the selected frequencies (step 906). The optimization may take into account the type of material from which the lattice will be fabricated and the size and shape of the desired overall lattice structure. Other parameters may also be included in the optimization process.

Figure 10:
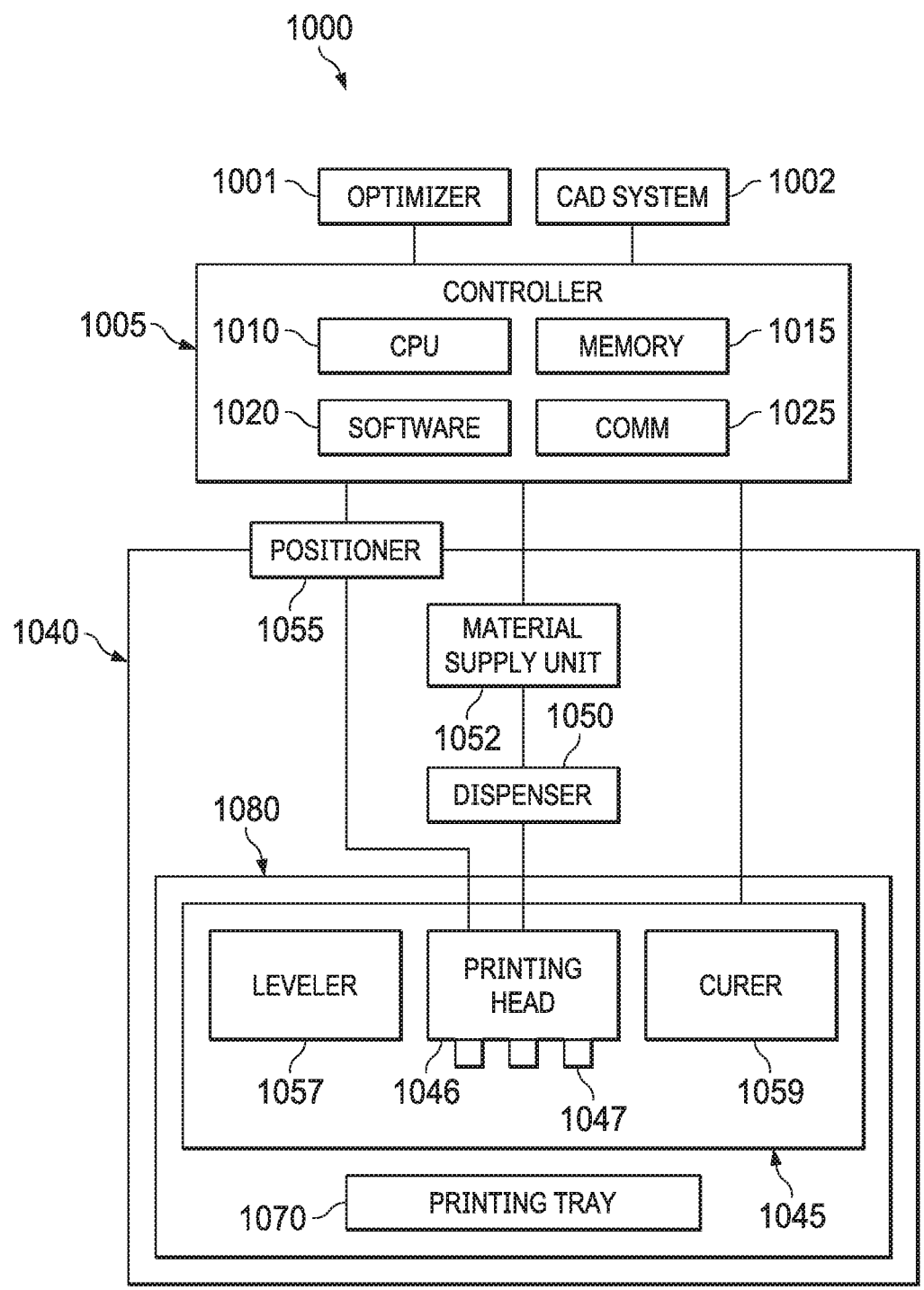
FIG. 10 is a block diagram of a 3D printer system depicted in accordance with an illustrative embodiment.

Next, the process additively fabricates the resonant lattice structure using the structural material (step 908). The material used to fabricate the lattice is selected FIG. 10 is a block diagram of a 3D printer system depicted in accordance with an illustrative embodiment. 3D printer system 1000 may implement the methods disclosed herein. The 3D printer system 1000 may also implement acoustic metamaterial fabrication system 800. 3D printer system 1000 may include, for example, an optimizer 1001 a CAD module 1002 or other design module, controller 1005, and printing apparatus 1040.

The optimizer 1001 determines a number and desired mass density of a plurality of resonator discs that are to be fabricated within a lattice structure. The number and desired mass density of the resonators is determined such that the fabricated lattice structure has desired acoustic properties and attenuates acoustic frequencies within a selected range.

Controller 1005, which may prepare the digital data that characterizes a 3-D object for printing, and control the operation of the printing apparatus, may include, for example, a processor 1010, a memory unit 1015, software code 1020, and a communications unit 1025. Other configurations may be used for a controller or control unit. Control functionality may be spread across units, and not all control functionality may be within system 1000. For example, a separate unit, such as a personal computer or workstation, or a processing unit within a supply source such as a cartridge may provide some control or data storage capability. Communications unit 1025 may, for example, enable transfer of data and instructions between controller 1005 and optimizer 1001 and/or CAD module 1002, between controller 1005 and printing apparatus 1040, and/or between controller 1005 and other system elements. Controller 1005 may be suitably coupled and/or connected to various components of printing apparatus 1040.

Printing apparatus 1040 can include for example positioner(s) 1055, material dispenser 1050, material supply unit 1052, and printing sub-system 1080. Printing sub-system 1080 may include a printing box 1045, and a printing tray 1070. Printing box 1045 may include printing head(s) 1046, printing nozzle(s) 1047, leveler(s) 1057, curer(s) 1059, and other suitable components. Positioner 1055, or other suitable movement devices, may control the movement of printing head 1045. Leveler or leveling device 1057 may include, for example, a roller or blade or other suitable leveling mechanism. Printing head 1045 may be, for example, an ink jet head or other suitable printing head. Optionally, the printing head 1045 might also include a sintering laser (not shown) for use in a powder bed process.

Controller 1005 may utilize Computer Object Data (COD) representing an object or a model, for example, CAD data in STL format. Controller 1005 may also utilize optimized data from optimizer 1001. Other data types or formats may be used. Controller 1005 may convert such data to instructions for the various units within 3D printer system 1000 to print a 3D object. Controller 1005 may be located inside printing apparatus 1040 or outside of printing apparatus 1040. Controller 1005 may be located outside of printing system 1000 and may communicate with printing system 1000, for example, over a wire and/or using wireless communications. In some embodiments, controller 1005 may include a CAD system or other suitable design system. In alternate embodiments, controller 1005 may be partially external to 3D printer system 1000. For example, an external control or processing unit (e.g., a personal computer, workstation, computing platform, or other processing device) may provide some or all of the printing system control capability.

In some embodiments, a printing file or other collection of print data may be prepared and/or provided and/or programmed, for example, by a computing platform connected to 3D printer system 1000. The printing file may be used to determine, for example, the order and configuration of deposition of building material via, for example, movement of and activation and/or non-activation of one or more nozzles 1047 of printing head 1045, according to the 3D object to be built.

Controller 1005 may be implemented using any suitable combination of hardware and/or software. In some embodiments, controller 1005 may include, for example, a processor 1010, a memory 1015, and software or operating instructions 1020. Processor 1010 may include conventional devices, such as a Central Processing Unit (CPU), a microprocessor, a "computer on a chip", a micro controller, etc. Memory 1015 may include conventional devices such as Random Access Memory (RAM), Read-Only Memory (ROM), or other storage devices, and may include mass storage, such as a CD-ROM, a hard disk, solid state drive (SDD), or flash storage. Controller 1005 may be included within, or may include, a computing device such as a personal computer, a desktop computer, a mobile computer, a laptop computer, a server computer, or workstation (and thus part or all of the functionality of controller 1005 may be external to 3D printer system 1000). Controller 1005 may be of other configurations, and may include other suitable components.

According to some embodiments of the present invention, material supply unit 1052 supplies building materials to printing apparatus 1040. Building materials may include any suitable kind of object building material, such as, for example, photopolymers, wax, powders, plastics, metals, and may include modeling material, support material and/or release material, or any alternative material types or combinations of material types. In some embodiments of the present invention, the building materials used for construction of the 3D object are in a liquid form.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware. Some steps of the process may be implemented by an additive manufacturing machine such as, for example, a 3D printer.

In some alternative implementations of an illustrative embodiment, the function or functions noted in the blocks may occur out of the order noted in the figure. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Detailed embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive.

Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

For purposes of the description hereinafter, the terms "upper," "lower," "right," "left," "vertical," "horizontal," "top," "bottom," and derivatives thereof shall relate to the embodiments of the disclosure, as it is oriented in the drawing figures. The terms "positioned on" means that a first element, such as a first structure, is present on a second element, such as a second structure, wherein intervening elements, such as an interface structure, e.g. interface layer, may be present between the first element and the second element.

In this disclosure, when an element, such as a layer, region, or substrate is referred to as being "on" or "over" another element, the element can be directly on the other element or intervening elements can also be present. In contrast, when an element is referred to as being "directly on," "directly over," or "on and in direct contact with" another element, there are no intervening elements present, and the element is in contact with another element.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. An acoustic resonant structure, comprising:
 a lattice including a plurality of support struts; and
 a plurality of resonating struts extending between the plurality of support struts, wherein the plurality of resonating struts are configured to attenuate acoustic waves within a predetermined range of frequencies while allowing acoustic waves outside the predetermined range of frequencies to pass through the acoustic resonant structure unattenuated, and wherein at least one of the plurality of resonating struts further comprises a resonating member.

2. The acoustic resonant structure of claim 1, wherein the lattice has a pyramidal lattice structure.

3. The acoustic resonant structure of claim 2, wherein pyramidal lattice elements form rectangular lattice cells.

4. The acoustic resonant structure of claim 1, wherein the plurality of resonating struts extend between intersections of the plurality of support struts.

5. The acoustic resonant structure of claim 1, wherein the resonating member comprises a resonating disc and the frequencies of acoustic waves attenuated by the plurality of resonating struts are determined according to number, mass density, and stiffness of the plurality of resonating struts.

6. The acoustic resonant structure of claim 5, wherein the mass density of at least one of the plurality of resonating struts is different from the mass density of at least one other of the plurality of resonating struts.

7. The acoustic resonant structure of claim 1, wherein all components of the resonant structure are made from a single material.

8. The acoustic resonant structure of claim 1, wherein the resonant structure has an acoustic property comprising at least one of a negative effective dynamic moduli, a negative effective dynamic density, a negative refractive index, an imaginary speed of sound, a complex wave number, and a purely imaginary wave number.

9. The acoustic resonant structure of claim 1, wherein the resonant structure has an acoustic property comprising at least one of acoustic dampening, structural isolation, acoustic cloaking, no vibrational wave propagation.

10. The acoustic resonant structure of claim 1, wherein the resonant structure is interposed between two bodies a first body and a second body and is configured to isolate the second body from acoustic waves from the ether first body over the predetermined range of frequencies.

11. The acoustic resonant structure of claim 1, wherein the plurality of resonating struts are configured to attenuate acoustic waves within the predetermined range of frequencies by at least one of:
   reflecting;
   redirecting;
   damping;
   storing energy elastically; and
   storing energy kinetically.

12. A method of attenuating acoustic waves, comprising:
   forming an acoustic resonant structure comprising:
      a lattice including a plurality of support struts;
      a plurality of resonating struts extending between the plurality of support struts, wherein the plurality of resonating struts are configured to attenuate acoustic waves within a predetermined range of frequencies while allowing acoustic waves outside the predetermined range of frequencies to pass through the resonant structure unattenuated, wherein at least one of the plurality of resonating struts further comprises a resonating member; and
   interposing the resonant structure between a first body and a second body to isolate the second body from acoustic waves from the first body over the predetermined range of frequencies.

13. The method of claim 12, wherein the lattice has a pyramidal lattice structure.

14. The method of claim 13, wherein pyramidal lattice elements form rectangular lattice cells.

15. The method of claim 12, wherein the resonating member comprises a resonating disc and the frequencies of acoustic waves attenuated by the plurality of resonating struts are determined according to number, mass density, and stiffness of the plurality of resonating struts.

16. The method of claim 15, wherein the mass density of at least one of the plurality of resonating struts is different from the mass density of at least one other of the plurality of resonating struts.

17. The method of claim 12, further comprising forming the acoustic resonant structure from a single material.

18. The method of claim 12, wherein the resonant structure has an acoustic property comprising at least one of a negative effective dynamic moduli, a negative effective dynamic density, a negative refractive index, an imaginary speed of sound, a complex wave number, and a purely imaginary wave number.

19. The method of claim 12, wherein the resonant structure has an acoustic property comprising at least one of acoustic dampening, structural isolation, acoustic cloaking, no vibrational wave propagation.

20. The method of claim 12, wherein attenuating acoustic waves within the predetermined range of frequencies further comprises at least one of:
   reflecting;
   redirecting;
   damping;
   storing energy elastically; and
   storing energy kinetically.

21. The method of claim 12, further comprising forming the acoustic resonant structure using additive manufacturing.

22. A method, comprising
   attenuating acoustic waves between a first body and a second body over a predetermined range of frequencies using an acoustic resonant structure interposed between the first body and the second body, wherein the acoustic resonant structure comprises:
      a lattice including a plurality of support struts; and
      a plurality of resonating struts extending between the plurality of support struts,
         wherein the plurality of resonating struts are configured to attenuate acoustic waves within the predetermined range of frequencies while allowing acoustic waves outside the predetermined range of frequencies to pass through the resonant structure unattenuated,
         wherein at least one of the plurality of resonating struts further comprises a resonating member, and
         wherein the resonating member comprises a resonating disc and the frequencies of acoustic waves attenuated by the plurality of resonating struts are determined according to number, mass density, and stiffness of the plurality of resonating struts.

* * * * *